(12) United States Patent
Hughes et al.

(10) Patent No.: US 7,698,021 B2
(45) Date of Patent: Apr. 13, 2010

(54) METHOD AND APPARATUS FOR PRODUCING PAINT

(75) Inventors: Randall L. Hughes, Glendale, AZ (US);
Andrew B. Titus, Mesa, AZ (US);
Danny P. Boyle, Gilbert, AZ (US);
Michael Mowen, Gilbert, AZ (US)

(73) Assignee: Microblend Technologies, Inc., Gilbert, AZ (US)

( * ) Notice: Subject to any disclaimer, the term of this patent is extended or adjusted under 35 U.S.C. 154(b) by 61 days.

(21) Appl. No.: 11/757,264

(22) Filed: Jun. 1, 2007

(65) Prior Publication Data
US 2008/0300714 A1    Dec. 4, 2008

(51) Int. Cl.
*G05D 11/02* (2006.01)
(52) U.S. Cl. ........... 700/285; 700/239; 700/282; 700/283; 366/132; 222/129; 137/3
(58) Field of Classification Search ......... 700/282, 700/177, 239, 283, 285; 366/132, 140, 141, 366/152; 222/144.5, 129
See application file for complete search history.

(56) References Cited
U.S. PATENT DOCUMENTS

| | | | |
|---|---|---|---|
| 3,956,206 A | | 5/1976 | Sellars et al. |
| 4,046,287 A | | 9/1977 | Hoekstra et al. |
| 4,243,430 A | | 1/1981 | Sperry et al. |
| 4,272,824 A | * | 6/1981 | Lewinger et al. ............ 700/265 |
| D262,628 S | | 1/1982 | Meyer |
| 4,373,930 A | | 2/1983 | Rothwell |
| 4,403,866 A | * | 9/1983 | Falcoff et al. ............... 366/132 |
| 4,436,845 A | | 3/1984 | Kitano |
| 4,705,083 A | * | 11/1987 | Rossetti ..................... 141/104 |
| 4,812,047 A | * | 3/1989 | Baumann .................... 366/141 |
| 4,830,508 A | * | 5/1989 | Higuchi et al. .............. 366/141 |
| 4,871,262 A | * | 10/1989 | Krauss et al. ............... 366/160.3 |
| 4,880,842 A | | 11/1989 | Kowalski et al. |
| 5,078,302 A | | 1/1992 | Hellenberg |
| 5,129,551 A | | 7/1992 | Gott |
| 5,203,366 A | * | 4/1993 | Czeck et al. ................... 137/3 |
| 5,230,739 A | * | 7/1993 | Bartow ....................... 118/694 |
| 5,340,210 A | * | 8/1994 | Patel et al. .................. 366/132 |

(Continued)

FOREIGN PATENT DOCUMENTS

CA    935255    10/1973

(Continued)

OTHER PUBLICATIONS

Patton, "Latex Critical Pigment Volume Concentration (LCPVC)", Paint Flow and Pigment Dispersion, 1979, p. 193.

(Continued)

*Primary Examiner*—Ramesh B Patel
*Assistant Examiner*—Dave Robertson
(74) *Attorney, Agent, or Firm*—Schmeiser, Olsen & Watts LLP (57) ABSTRACT

A paint manufacturing system includes a paint component storage system and a colorant storage system. A dispenser is in fluid communication with the paint component and colorant storage systems. A spectrophotometer is operatively coupled with a computer system. The computer system controls the flow of paint components from the paint component storage system and colorants from the colorant storage system.

25 Claims, 10 Drawing Sheets

U.S. PATENT DOCUMENTS

| | | | |
|---|---|---|---|
| 5,350,527 A * | 9/1994 | Kitko | 210/804 |
| 5,445,195 A | 8/1995 | Kim | |
| 5,474,211 A * | 12/1995 | Hellenberg | 222/1 |
| 5,521,234 A | 5/1996 | Brown et al. | |
| 5,527,853 A | 6/1996 | Landy et al. | |
| 5,643,669 A | 7/1997 | Tsuei | |
| 5,672,649 A | 9/1997 | Brock et al. | |
| 5,673,818 A * | 10/1997 | Kaneski et al. | 222/105 |
| 5,773,752 A | 6/1998 | Blume et al. | |
| 5,823,670 A * | 10/1998 | Rushing et al. | 366/152.1 |
| 5,833,364 A * | 11/1998 | Rushing et al. | 366/152.1 |
| 5,842,641 A | 12/1998 | Mazzalveri | |
| 5,877,234 A | 3/1999 | Xu et al. | |
| 5,922,398 A | 7/1999 | Hermes et al. | |
| 5,935,332 A * | 8/1999 | Caucal | 118/429 |
| 5,989,331 A | 11/1999 | Bauer et al. | |
| 6,000,837 A * | 12/1999 | Randsborg et al. | 366/141 |
| 6,013,721 A | 1/2000 | Schall et al. | |
| 6,074,474 A | 6/2000 | Broome et al. | |
| 6,120,175 A * | 9/2000 | Tewell | 366/140 |
| 6,138,724 A * | 10/2000 | Rivera et al. | 141/369 |
| 6,221,145 B1 | 4/2001 | McClain | |
| 6,308,499 B1 | 10/2001 | Takada et al. | |
| 6,689,824 B2 * | 2/2004 | Friel et al. | 523/172 |
| 6,883,561 B2 | 4/2005 | Bartholomew et al. | |
| 6,969,190 B1 * | 11/2005 | McClain et al. | 366/141 |
| 6,991,004 B2 * | 1/2006 | Kaufhold et al. | 141/83 |
| 7,059,760 B2 * | 6/2006 | Mehta et al. | 366/138 |
| 7,065,429 B1 * | 6/2006 | McClain et al. | 700/239 |
| 7,147,012 B2 * | 12/2006 | Kaufhold et al. | 141/11 |
| 7,250,464 B2 * | 7/2007 | Friel et al. | 524/497 |
| 7,264,160 B2 * | 9/2007 | Polarine et al. | 235/385 |
| 7,264,161 B2 * | 9/2007 | Polarine | 235/385 |
| 7,530,373 B2 * | 5/2009 | Lewis et al. | 141/9 |
| 7,575,013 B2 * | 8/2009 | Bergman | 137/3 |
| 7,591,904 B2 * | 9/2009 | Bertz et al. | 118/420 |
| 7,612,129 B2 * | 11/2009 | Friel et al. | 523/351 |
| 2002/0061263 A1 * | 5/2002 | Taylor | 422/129 |
| 2004/0059041 A1 * | 3/2004 | McClain et al. | 524/497 |
| 2008/0251546 A1 * | 10/2008 | Khoo et al. | 222/485 |

FOREIGN PATENT DOCUMENTS

| | | | |
|---|---|---|---|
| DE | 3910472 | | 10/1989 |
| DE | 19714577 | | 10/1998 |
| EP | 176140 | A * | 4/1986 |
| EP | 0614951 | | 9/1994 |
| EP | 0706543 | | 4/1996 |
| EP | 1094096 | | 4/2001 |
| IE | 940666 | | 3/1996 |
| JP | 59172559 | | 9/1984 |
| WO | 9425238 | | 11/1994 |
| WO | 9529960 | | 11/1995 |
| WO | 9805417 | | 2/1998 |
| WO | 0037568 | | 6/2000 |
| WO | 0044834 | | 8/2000 |

OTHER PUBLICATIONS

Forsius, "Paint Production by Component Mixing", Faerg Lack Scand., 1997, 43(2), 5-6.

Dutheillet, "Integrated Solution to Build Batch Processing Plants for Blending & Formulation Industries", Chemical Engineering World, 1997 32(5), 37-44.

Orcun, et al., "Scheduling of Batch Processes: An Industrial Application in Paint Industry", Computers Chem. Enng., 1997, 21, S673-S678.

"Component Mixing—A New Approach to Customized Paint Production", High Technology Finland, 2000, 156-157.

Helander, "Benefits of delayed product differentiation", Reprinted from PPCJ, 1999.

Helander, "Impact of Form Postponement on Channel Members' Performance in Paint Business: A Theoretical Approach", LTA, 1999, p. 225-237.

PCT International Search Report; International Application No. PCT/US08/65566; International Filing Date Jun. 2, 2008.

* cited by examiner

METHOD AND APPARATUS FOR PRODUCING PAINT

BACKGROUND OF THE INVENTION

1. Field of the Invention

This invention relates to a system for manufacturing a desired type of paint having a desired color.

2. Description of the Related Art

Paint is generally manufactured at a paint manufacturing facility and then transported in separate containers to a point of sale, wherein each container contains one type and color of paint. Different types of paint typically include different paint components in various amounts. The type and amount of paint components included in a paint determine its characteristics, such as drying time, quality level, sheen, finish, texture, etc. For example, some types of paint have a flat finish and others have a high-gloss finish. Consumers often desire different types of paint in different colors, so an inventory of them is maintained at the point of sale to satisfy consumer needs.

However, there are several problems with maintaining an inventory of different types and colors of paint. One problem is that the properties of paint degrade over time. For example, paint has a tendency to settle the longer it is stored in the inventory. A paint settles when the mixture of paint components included therein become unmixed. If the paint degrades enough, it may be unsuitable for use and discarded, which leads to waste. Hence, it is desirable to use the paint before its properties degrade.

It is also very labor intensive and costly to keep track of the manufacturing dates of the different types of paint in the inventory. It is necessary to keep track of the manufacturing dates to determine which paint is suitable for use and which is not. The inventory is often tracked by determining the number of paint containers containing a particular type and color of paint. Since it is labor intensive and costly to keep track of changes in the inventory, it is desirable to reduce this need.

BRIEF SUMMARY OF THE INVENTION

The present invention employs a paint manufacturing system for manufacturing a desired type and color of paint. The paint manufacturing system includes a paint component storage system and a colorant storage system. A dispenser is in fluid communication with the paint component and colorant storage systems. The paint manufacturing system also includes a spectrophotometer that is operatively coupled with a computer system. The computer system controls the flow of paint components from the paint component storage system and colorants from the colorant storage system.

The paint component storage system dispenses, through the dispenser, a desired combination of paint components in response to a paint type indication. The desired combination of paint components form a base paint. The colorant storage system dispenses, through the dispenser, a desired combination of colorants in response to a paint color indication. The colorants dispensed are chosen to drive the color of the base paint to a desired color. In this way, the desired type and color of paint is provided. In some situations, the computer system determines the colorants dispensed in response to a colorant signal from the spectrophotometer. In other situations, the computer system determines the colorants dispensed in response to the selection of a color data file.

These and other features, aspects, and advantages of the present invention will become better understood with reference to the following drawings and description.

BRIEF DESCRIPTION OF THE DRAWINGS

FIG. 1b is a perspective view of one embodiment of a dispenser, in accordance with the invention, included with the paint manufacturing system of FIG. 1a.

FIG. 1c is a bottom view of a support structure included with the dispenser of FIG. 1b.

FIG. 1e is a perspective view of a colorant storage system, in accordance with the invention, included with the paint manufacturing system of FIG. 1a.

FIG. 2a is a perspective view of a paint manufacturing system, in accordance with the invention, which includes the paint manufacturing system of FIG. 1a.

FIG. 2b is a schematic diagram of the paint manufacturing system of FIG. 2a.

FIG. 2c is a perspective view of an elevated support structure included with the paint manufacturing system of FIG. 2a.

DETAILED DESCRIPTION OF THE INVENTION

The present invention allows the manufacture of a desired type and color of paint at a point of sale. Manufacturing the paint at the point of sale is useful for several reasons, with one being that the desired paint can be manufactured in response to the desires of the consumer. Hence, the type and color of the paint can be selected by the consumer before the paint is manufactured. This allows the paint retailer to provide an "inventory on demand", wherein an inventory of paint is produced in response to an indication that the consumer wants a particular type and color of paint. If the type and color of the paint produced is desired, the consumer is more likely to purchase it. Hence, the consumer is more likely to want paint and to purchase it if the paint is manufactured at the point of sale.

Manufacturing the paint at the point of sale is also useful because the paint is made and sold shortly thereafter. Hence, there is no need to maintain an inventory of paint without a purchaser for it. There is also no need to keep an inventory of different types and colors of paint from which the consumer makes a selection. It is also no longer necessary to keep track of changes in the inventory of paint. Manufacturing the paint at the point of sale is also useful because the paint manufacturing system used can occupy less space than the inventory of paint.

To increase the likelihood of the consumer making a paint purchase, a large number of different types and colors of paint need to be kept in inventory to increase the likelihood that the paint the consumer wants is available. However, the amount of space used to store the paint increases as the amount of different types and/or colors of paint in the inventory increases. It is generally desirable to decrease the amount of space used to store the paint because this space costs money and may be more useful for other purposes, such as the sale of goods and/or services. Space used for the sale of goods and services typically generates more income than space used for storing paint.

Manufacturing the paint at the point of sale is also useful because of the decreased time the paint is stored. This is useful because paint is more likely to degrade as the time it is stored increases. The paint can degrade in many different ways, such as by settling. The paint can also degrade if it experiences undesirable temperature and humidity changes. If the paint degrades too much, it can be unsatisfactory for use. The paint can be unsatisfactory for use in many different ways, such as if its color undesirably changes or if the amount of paint components included therein changes. The amount of paint components in the paint can undesirably change in many different ways, such as by evaporation. Some paint components evaporate faster than others, so the relative amounts of the paint components changes over time. If the relative amounts of the paint components change too much, the paint may be unsuitable for its intended purpose, such as for indoor or outdoor use. Hence, it is desirable to decrease the time between manufacturing and selling the paint, as well as the time between manufacturing and using the paint.

It should be noted that paint can include many different paint components, but it generally includes two or more. Each paint component typically includes many different types of materials combined together. It should also be noted that the paint components can be stored separately from each other for longer periods of time than a paint composed of them. Further, the paint components do not degrade as quickly as paint composed of them will. Hence, it is desirable to store paint components in separate containers instead of in the same container, as is done with paint composed of the components.

Examples of paint components typically used to make paint include resin, pigment composition, and dispersant thickening agent. The resin can be a material with a high or low resin content, wherein the high resin content material includes more resin than the low resin content material. These paint components often include water as the solvent, so they are considered to be aqueous based. The paint components are combined together in different amounts to provide a base paint, which is often colored to provide a desired type and color of paint. The paint components can be combined together in many different ways, such as by mixing.

There are many different types of base paints that can be made from the paint components. In one embodiment, the types of base paints include pastel, tinting, deep tone and neutral base paints. The pastel base paint has the lightest color and the neutral base paint has the darkest color. Further, the tinting base paint is lighter than the deep tone base paint, but darker than the pastel base paint. The deep tone base paint is darker than the tinting base paint, but lighter than the neutral base paint. These base paints are generally provided with a desired quality level and sheen. It should be noted that four types of base paints are discussed here for illustrative purposes. However, another number of base paints, such as pastel, tinting and neutral, can also be used.

In accordance with the invention, one or more colorants are combined with the base paint to provide it with the desired color. Hence, the desired paint generally includes the base paint and one or more colorants combined therewith. The colorant(s) are combined with the base paint by combining them with the paint components included therein. In this way, the color of the base paint is driven to the desired color. The colorant(s) can be combined with the paint components in many different ways, such as by mixing. In this way, a desired type of paint is manufactured and provided with a desired color at the point of sale.

Figure 1A:
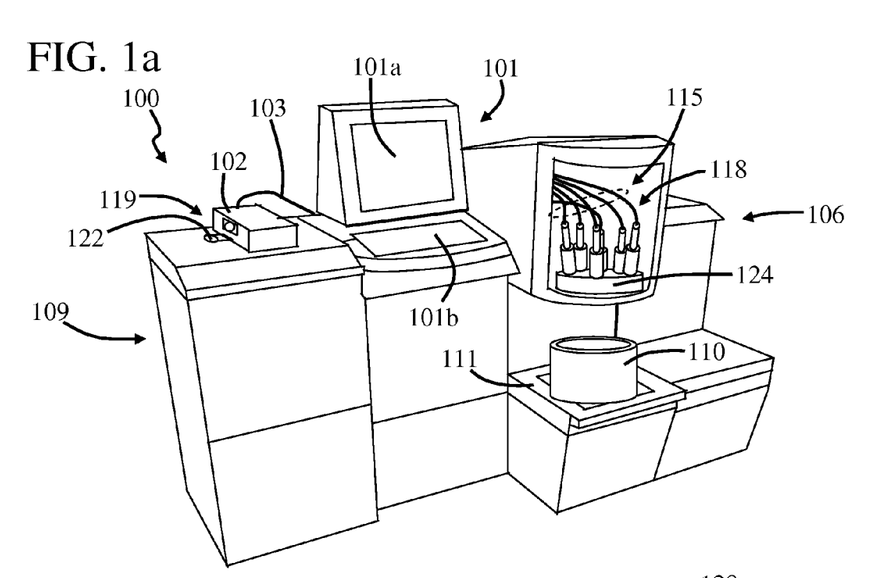
FIG. 1a is a perspective view of a paint manufacturing system, in accordance with the invention.

FIG. 1a is a perspective view of a paint manufacturing system 100, in accordance with the invention. It should be noted that paint manufacturing system 100 is generally located at a point of sale. The point of sale can be at many different locations, such as a store and a warehouse. Examples of stores include paint stores, as well as hardware and home improvement stores. The store is generally a retail store which provides the sale of goods and/or services.

In this embodiment, paint manufacturing system 100 includes a computer system 101 which includes a monitor 101a and an input device 101b. In one example, monitor 101a is embodied as a touch-screen monitor and input device 101b is embodied as a keyboard. Computer system 101 operates software that controls the operation of several paint manufacturing system components. These paint manufacturing system components allow system 100 to provide the desired type and color of paint at the point of sale, as will be discussed in more detail below. The type and color of the paint is determined by the paint components and colorants included therein. The paint components and colorants are predetermined in response to one or more indications provided to computer system 101. The indications are generally provided to computer system 101 through monitor 101a and/or input device In this embodiment, paint manufacturing system 100 includes a dispenser 106 which is controlled by computer system 101. Dispenser 106 dispenses materials which form the paint. These materials can be of many different types, such as the paint components and colorants mentioned above. Dispenser 106 includes paint component nozzles 118 supported by a nozzle support structure 124. Nozzles 118 dispense pre-selected paint components in response to an indication from computer system 101. Nozzles 118 are connected to a paint component storage system (not shown) through a plumbing system 115. Plumbing system 115 includes hoses which allow paint components to flow between the paint component storage system and paint component nozzles 118 in response to an indication from computer system 101.

The paint components are dispensed through paint component nozzles 118 and into a paint container 110. Paint container 110 can be of many different types, such as a paint bucket, which allows the paint to be contained and carried away from the point of sale. In this embodiment, paint container 110 is supported on a paint weight scale 111, which determines the weight of paint container 110 combined with the weight of the material dispensed through dispenser 106. Scale 111 can be of many different types, such as the PANTHER and PANTHER PLUS weighing terminals made by Mettler Toledo of Toledo, Ohio.

Figures 1B, 1C:
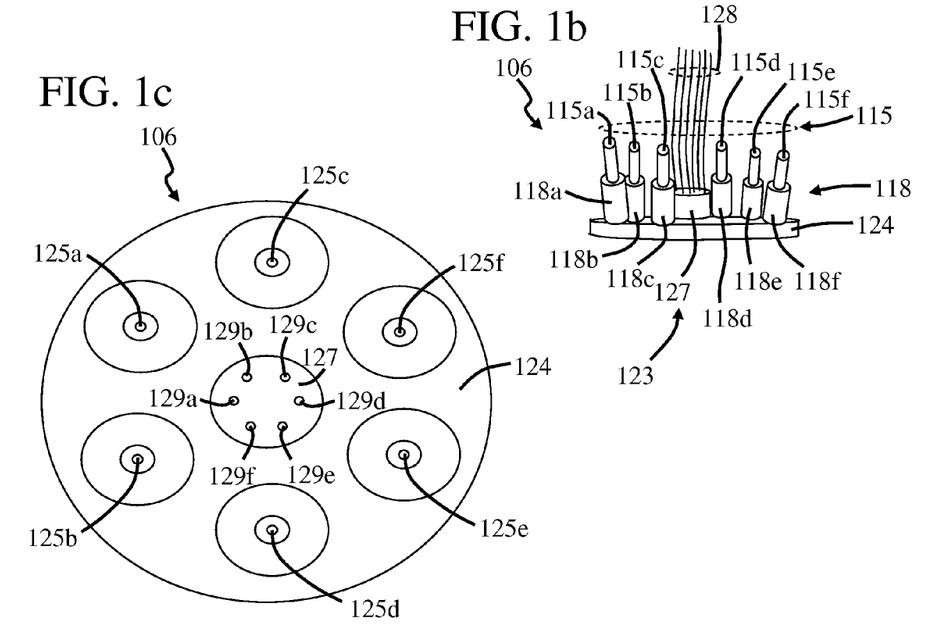

FIG. 1b is a perspective view of one embodiment of dispenser 106, in accordance with the invention. FIG. 1c is a bottom view of nozzle support structure 124 looking in a direction 123. In this embodiment, paint component nozzles 118 includes six paint component nozzles, denoted as nozzles 118a, 118b, 118c, 118d, 118e and 118f. Nozzles 118a, 118b, 118c, 118d, 118e and 118f are supported by nozzle support structure 124 and are in fluid communication with the paint component storage system (not shown) through hoses 115a, 115b, 115c, 115d, 115e and 115f, respectively. It should be noted that hoses 115a-115f are included in plumbing system 115 and terminate at openings 125a, 125b, 125c, 125d, 125e and 125f, respectively, as shown in FIG. 1c. Openings 125a-125f extend through a bottom surface of nozzle support structure 124 so that the respective paint components can be outputted through them and into paint container 110.

Figure 1D:
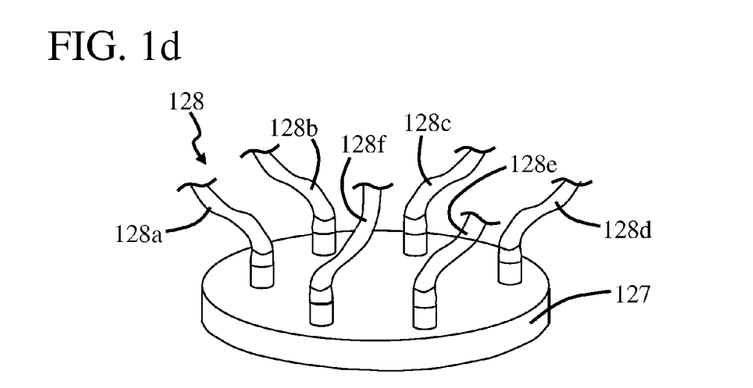
FIG. 1d is a perspective view of a colorant nozzle included with the dispenser of FIG. 1b.

In this embodiment, dispenser 106 includes a colorant nozzle 127 carried by nozzle support structure 124. Colorant nozzle 127 is connected to a colorant storage system (not shown) through a plumbing system 128. As shown in FIG. 1d, plumbing system 128 includes hoses 128a, 128b, 128c, 128d, 128e and 128f which extend therethrough nozzle 127 and terminate at openings 129a, 129b, 129c, 129d, 129e and 129f, respectively, as shown in FIG. 1c. It should be noted that FIG. 1d is a perspective view of colorant nozzle 127. Plumbing system 128 allows colorant components to flow between the colorant storage system and colorant nozzle 127. The colorant components are dispensed through openings 129a-129f and into paint container 110 wherein they are combined with the paint components. The colorant storage system will be discussed in more detail presently.

Figure 1E:
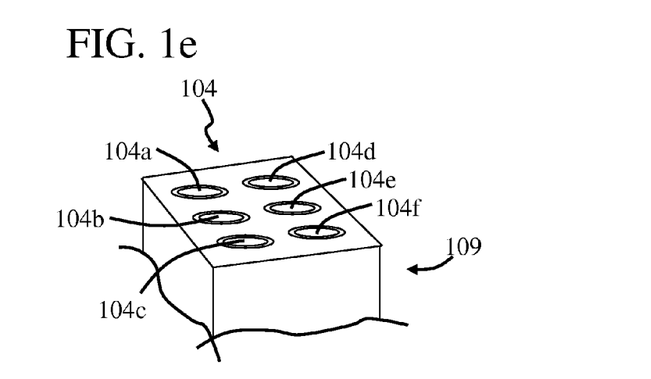
Figure 1F:
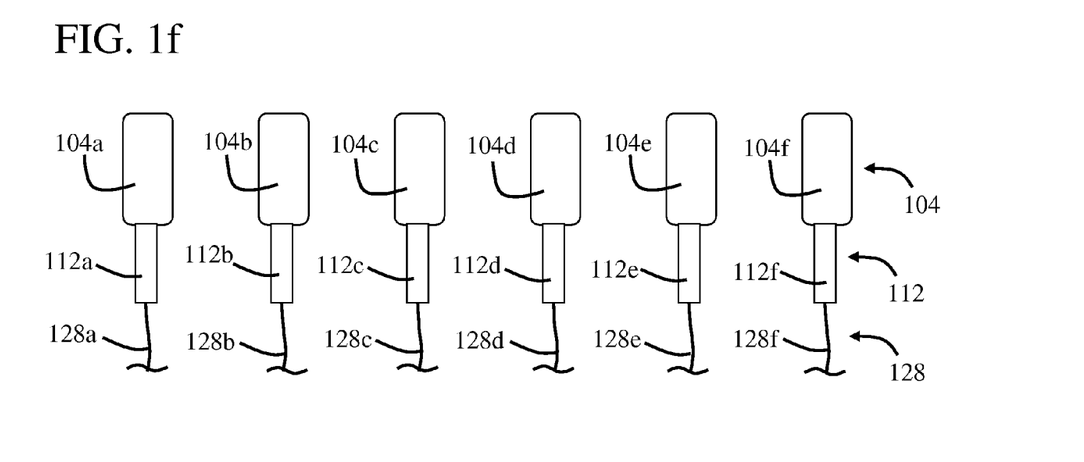
FIG. 1f is a schematic diagram of the colorant storage system of FIG. 1e.

FIG. 1e is a perspective view of one embodiment of a colorant storage system 104, in accordance with the invention, and FIG. 1f is a schematic diagram of colorant storage system 104. It should be noted that colorant storage system 104 is housed by paint manufacturing system 100 in a colorant storage cabinet 109, as shown in FIG. 1a, although it could be positioned elsewhere. In this embodiment, colorant storage system 104 is connected to plumbing system 128 through a mass flow control system 112. Colorant storage system 104 includes colorant storage containers 104a, 104b, 104c, 104d, 104e and 104f and mass flow control system 112 includes mass flow controllers 112a, 112b, 112c, 112d, 112e and 112f. Colorant storage containers 104a, 104b, 104c, 104d, 104e and 104f are connected to hoses 128a, 128b, 128c, 128d, 128e and 128f, respectively, through mass flow controllers 112a, 112b, 112c, 112d, 112e and 112f, respectively.

Colorant containers 104a-104f each contain a colorant which can be flowed into paint container 110 through hoses 128a-128f and openings 129a-129f (FIG. 1c), as discussed above, where they are combined with the paint components contained therein. In this way, the color of the paint components contained in container 110 is driven to the desired color.

It should be noted that, in this embodiment, colorant storage system 104 is shown as including six colorant containers for illustrative purposes, so it can provide six colors, as well as their corresponding color combinations. A color combination is two or more colors combined together to provide a shade of color. The two or more colors can be combined together in many different ways, such as by mixing. In other embodiments, however, colorant storage system 104 includes fewer or more colorants. For example, in one particular embodiment, colorant storage system 104 includes twelve colorant containers, so it can provide twelve colors, as well as their corresponding color combinations. In general, the number of colorant containers included in colorant storage system 104 determines the number of different colors and shades of colors that can be provided. The number of different colors and shades of colors that can be provided increases with the number of colorant containers. Further, the number of different colors and shades of colors that can be provided decreases with the number of colorant containers. The amount and colors of colorants flowed into paint container 110 can be determined in many different ways, a few of which will be discussed in more detail presently.

In operation, computer system 101 has access to a paint data file. The paint data file generally includes paint color and paint type information which can be read and changed, if desired, by computer system 101. However, the paint color and paint type information can be included with a paint color data file and a paint type data file, respectively, so that the paint data file includes separate data files.

The paint data file can be an existing data file, or it can be created or changed in response to the paint type and/or paint color indication provided to computer system 101. Further, the color and paint type data files can be existing data files, or they can be created or changed in response to the paint color and paint type indications, respectively. The paint data file, color data file and/or paint type data file can be stored internally with computer system 101 or externally to it.

The color data file includes paint color information that corresponds to the desired color of the paint manufactured with paint manufacturing system 100. The paint color information often represents the desired color in terms of a particular color scale. There are many different color scales that can be used to represent the desired color, with one being the Hunter color scale. The Hunter color scale represents colors with three color values, denoted as L, a and b. Hence, the paint color information can include L, a and b values corresponding to the desired color.

The paint type data file includes paint type information that corresponds to the desired type of the paint manufactured with paint manufacturing system 100. It should be noted that the desired type of paint includes a base paint, and the base paint depends on the desired color of paint. This is because the colorants are combined with the base paint to provide the paint with a desired shade of color. For example, if a dark color is desired, the paint type indication generally corresponds to a neutral base paint. If a light color is desired, the paint type indication generally corresponds to a pastel base paint. Colorants are combined with the base paint to provide a shade of color between pastel and neutral. Hence, the paint color indication depends on the paint type indication and the color data file depends on the paint type data file.

The paint type and paint color indications can be provided to computer system 101 in many different ways, such as by providing corresponding input through monitor 101a and/or input device 101b. The paint type and paint color indications are generally provided to computer system 101 in response to an indication that a customer desires a particular type and color of paint.

In one embodiment, paint type and paint color data files are selected in response to the paint type and paint color indications, respectively, provided to computer system 101. The paint type and paint color indications can be provided to computer system 101 in many different ways, such as by providing corresponding input through monitor 101a and/or input device 101b.

In one situation, the paint type and paint color indications are provided to computer system 101 in response to one or more inputs provided through monitor 101a and/or input device 101b. In response to the paint type indication, a paint type data file is selected. The selected paint type data file corresponds to a base paint having a color associated with the color indicated by the paint color indication. In response to the desired paint color indication, a color data file is selected. The selected color data file corresponds to the type and amount of colorants that will drive the color of the base paint, when combined therewith, to the desired color. In this way, the desired type of paint having the desired color is manufactured by using paint manufacturing system 100. In other situations, however, the paint color indication is provided to computer system 101 with a colorant signal, as will be discussed in more detail presently.

As shown in FIG. 1a, paint manufacturing system 100 includes a spectrophotometer 102 in communication with computer system 101. Spectrophotometer 102 can be in communication with computer system 101 in many different ways, but a cable 103 is used here. In this way, computer system 101 and spectrophotometer 102 are operatively coupled together so signals can flow between them. Spectrophotometer 102 can be of many different types, such as those available from Greta Macbeth, MatchRite and Datacolor. Examples of spectrophotometers are also disclosed in U.S. Pat. Nos. 6,002,488 and 6,198,536.

Spectrophotometer 102 includes a sample holder 119 for holding a color sample 122. Color sample 122 can be of many different types, but it is often a color card corresponding to the desired color. In this way, the color of color sample 122 corresponds to the desired color of paint to be manufactured using paint manufacturing system 100.

In operation, spectrophotometer 102 flows a colorant signal $S_{Colorant}$ to computer system 101 through cable 103, wherein colorant signal $S_{Colorant}$ corresponds to the reflectance of color sample 122. The reflectance of color sample 122 corresponds to its paint color information. In response to colorant signal $S_{Colorant}$, computer system 101 stores the paint color information. The paint color information can be stored in many different locations, such as with the paint data file or an existing or created color data file. In this way, computer system 101 has access to paint color information corresponding to the color of color sample 122.

Once computer system 101 has access to the desired paint type and color information, computer system 101 determines the paint components and colorants needed to drive the color of the paint components to match the desired color. In this way, computer system 101 determines the paint components and colorants needed to drive the color of the base paint to match the desired color. It should be noted that, in accordance with the invention, the paint components and colorants are determined before they are dispensed.

After the paint type and colorants have been determined, computer system 101 provides an indication to mass flow control system 131 so that paint component storage system 130 dispenses the selected paint components. The selected paint components are dispensed by dispenser 106 to form the base paint, which is contained by container 110. Computer system 101 also provides an indication to mass flow control system 112 so that colorant storage system 104 dispenses the selected colorants. The selected colorants are dispensed by dispenser 106 into container 110 to drive the color of the base paint to match the desired color. If the color indication is provided by selecting the color data file, the color is driven to match the color corresponding to the paint color information included therein. If the color indication is provided by signal $S_{Colorant}$, the color is driven to match the color of color sample 122. In this way, the paint color indication can be provided to computer system 101 by using a spectrophotometer and a color sample.

It should be noted that the colorants can be selected in many different ways. For example, they can be selected to provide a desired accuracy in matching the color of the paint to the color of color sample 122. The colorants can also be selected based on cost. This is useful because some colorants are more expensive than others. Hence, the colorants can be selected to reduce costs, as well as the accuracy in color matching. The colorants can also be chosen in response to a desired use. For example, some colorants are better suited for outdoor use and other colorants are better suited for indoor use.

Figure 2A:
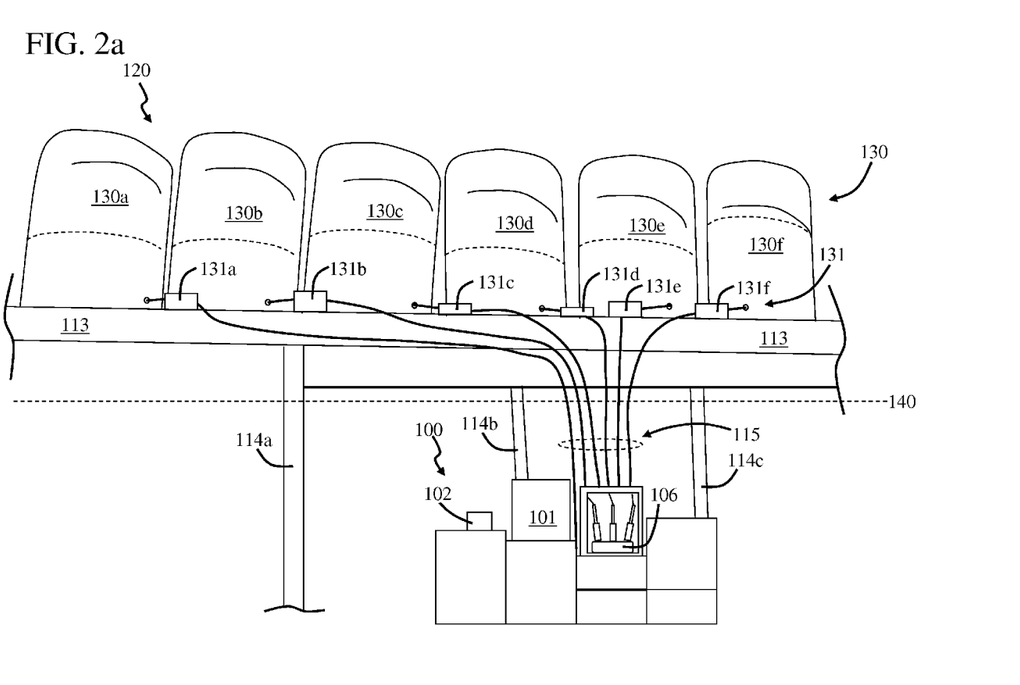
Figure 2B:
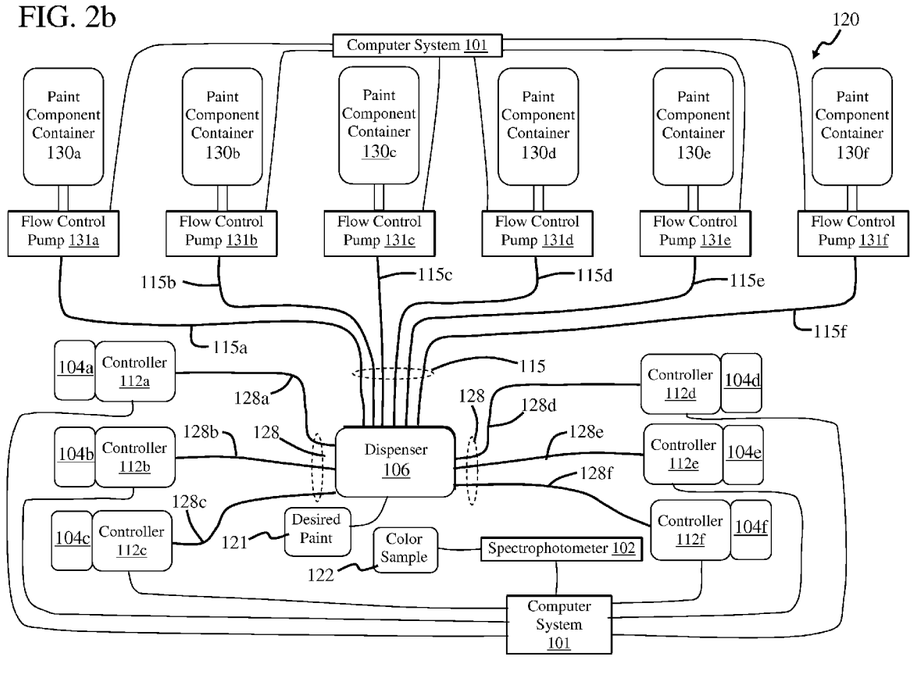

FIG. 2a is a perspective view of a paint manufacturing system 120, in accordance with the invention, and FIG. 2b is a schematic diagram of paint manufacturing system 120. In this embodiment, paint manufacturing system 120 includes paint manufacturing system 100 and a paint component storage system 130 in fluid communication with each other through plumbing system 115. Paint component storage system 130 includes paint component containers 130a, 130b, 130c, 130d, 130e and 130f. It should be noted that six paint component containers are shown in this embodiment, but there are generally two or more. The number of paint storage containers corresponds to the number of paint components. In one particular example, containers 130a, 130b, 130c and 130d each contain the pigment composition, dispersant thickening agent, high resin content binder and low resin content binder, respectively.

In this embodiment, paint component storage system 130 is in fluid communication with plumbing system 115 through a mass flow controller system 131. Mass flow controller system 131 includes mass flow controllers 131a, 131b, 131c, 131d, 131e and 131f. As shown in FIG. 2b, paint component containers 130a, 130b, 130c, 130d, 130e and 130f are in fluid communication with hoses 115a, 115b, 115c, 115d, 115e and 115f, respectively through mass flow controllers 131a, 131b, 131c, 131d, 131e and 131f, respectively. The operation of mass flow controllers 131a-131f is controlled by computer system 101. As discussed in more detail above, hoses 115a, 115b, 115c, 115d, 115e and 115f are connected to paint component dispensing nozzles 118a, 118b, 118c, 118d, 118e and 118f, respectively, of dispenser 106.

Paint component storage system 130 can be positioned at many different locations. In this embodiment, paint component storage system 130 is positioned above dispenser 106 and above paint manufacturing system 100. In this way, paint component storage system 130 is positioned above a level 140 which extends between paint component storage system 130 and paint manufacturing system 100. Hence, level 140 extends above paint manufacturing system 100 and below paint component storage system 130. Hence, the flow of paint components between paint component storage system 130 and paint manufacturing system 100 is from a position above level 140 to a position below it.

It should be noted that paint component storage system 130 can be positioned at many other locations. For example, in some embodiments, it can be positioned below dispenser 106 and below paint manufacturing system 100. Paint component storage system 130 can also be positioned so it is level with dispenser 106 and/or paint manufacturing system 100. However, these embodiments are not shown here for simplicity.

It should also be noted that, in this embodiment, all of paint component storage containers 130a, 130b, 130c, 130d, 130e and 130f are positioned above level 140. However, in other embodiments one or more of them are positioned above level 140 and the others are not. Further, mass flow controller system 131 is also positioned above level 140. However, one or more of the mass flow controllers included therein can be positioned level with or below level 140, if desired.

Paint component storage system 130 is positioned above paint manufacturing system 100 for many different reasons. One reason is that it occupies space that would otherwise not be used. If paint component storage system 130 is positioned on the floor that supports paint manufacturing system 100, then it is occupying space that could be used for other purposes, such as the sale of goods and/or services.

Another reason paint component storage system 130 is positioned above paint manufacturing system 100 is that paint components can be flowed into paint component storage containers 130a-130f without interrupting the operation of paint manufacturing system 100. For example, the operation of paint manufacturing system 100 could be interrupted with the loading of paint components into paint component storage system 130. Further, the levels of the paint components stored by paint component storage system 130 can be more easily monitored because containers 130a-130f are positioned where they can be more easily seen.

Paint component storage system 130 can be positioned above paint manufacturing system 100 in many different ways. For example, paint component storage system 130 can be positioned on a floor above the floor supporting paint manufacturing system 100. For the embodiment wherein paint component storage system 130 is positioned below paint manufacturing system 100, paint component storage system 130 can be positioned on a floor below the floor supporting paint manufacturing system 100.

In this embodiment, however, paint component storage system 130 is carried by an elevated support structure 113 which is elevated by support legs, some of which are denoted as support legs 114a, 114b and 114c. It should be noted that elevated support structure 113 can have many different configurations, one of which will be discussed in more detail presently.

Figure 2C:
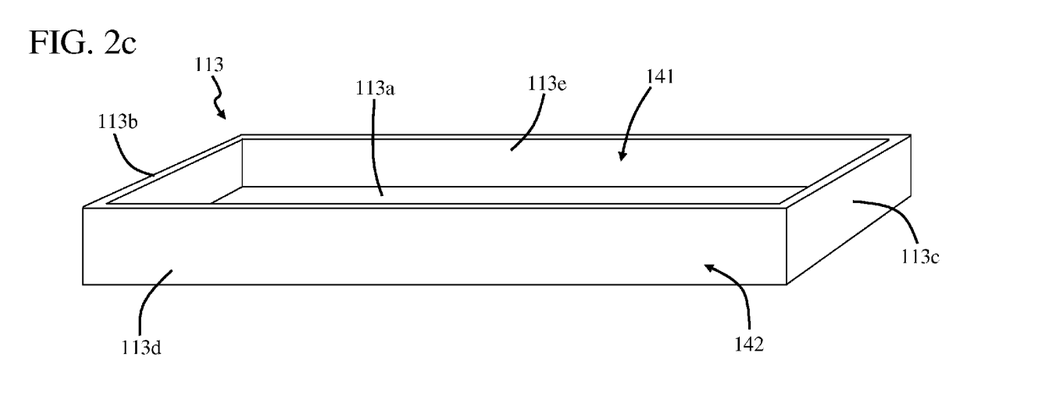

FIG. 2c is a perspective view of one embodiment of elevated support structure 113. In this embodiment, elevated support structure 113 includes a floor 113a and sidewalls 113b, 113c, 113d and 113e extending upwardly therefrom. Sidewalls 113b and 113c are opposed to each other and sidewalls 113d and 113e are opposed to each other. Sidewalls 113b-113e extend around the outer periphery of floor 113a so that sidewalls 113b-113e and floor 113a bound an inner volume 141. It is useful to form elevated support structure 113 so that it can contain paint components within inner volume 141. This is desirable in case one or more paint components leak from paint component storage system 130. The paint components can be contained within inner volume 141 in many different ways, such as by lining floor 113a, as well as sidewalls 113b-113e with a liner capable of containing the paint component(s).

In this embodiment, paint component storage system 130 is positioned on floor 113a in inner volume 141. It should be noted that, in some embodiments, mass flow controller system 131 is also positioned on floor 113a in inner volume 141, but it can be positioned outside of inner volume 141. When mass flow controller system 131 is positioned on floor 113a, plumbing system 115 (not shown) generally extends over sidewalls 113b, 113c, 113d, and/or 113e.

In operation, the type of paint desired is determined and this information is inputted into computer system 101 using touch screen 101a and/or keyboard 101b. The type of paint desired can be determined in many different ways, but it is usually determined in response to a consumer desire to purchase it. The information inputted into the computer can be of many different types, but it generally corresponds to the desired paint sheen, quality, coverage attributes, drying time, etc.

The program operated by computer system 101 determines the paint components, as well as their amounts, necessary to make the desired type of paint. In response to the determination of the paint components, computer system 101 operates flow control system 131 so that paint component storage system 130 flows the amount and type of paint components to dispenser 106 through plumbing system 115. The paint components are dispensed by nozzles 118 into paint container 110, as described above, to form a desired paint 121, as shown in FIG. 2b. In this way, nozzles 118 dispense pre-selected paint components in response to an indication from computer system 101. The amount of paint components dispensed can be determined in many different ways, such as by volume and weight. In this embodiment, however, the paint components are dispensed by weight, as determined by paint weight scale 111.

As discussed above, desired paint 121 can be provided with a desired color by using color sample 122 and spectrophotometer 102 or by using a color data file. In the situation in which color sample 122 and spectrophotometer 102 are used, color sample 122 is held by sample holder 119 and spectrophotometer 102 flows colorant signal $S_{Colorant}$ to computer system 101 through cable 103. Computer system 101 receives signal $S_{Colorant}$ and determines the amount and color of the colorants needed to drive the color of the paint component combination contained by container 110 to match the color of color sample 122. The amount of paint colorants dispensed can be determined in many different ways, such as by volume and weight. In this embodiment, however, the colorants are dispensed by volume, as determined by colorant mass flow control system 112.

In response to the determination of the colorants, computer system 101 operates colorant mass flow control system 112 so that colorant storage system 104 flows the amount and color of colorants to dispenser 106 through plumbing system 128. The colorants are dispensed by colorant nozzle 127 into paint container 110 so that desired paint 121 is provided with a desired color. In this way, plumbing system 128 allows colorant components to flow between colorant storage system 104 and colorant nozzle 127 in response to an indication from computer system 101.

In the situation in which the color data file is used, the color data file is selected and it provides data to computer system 101 that corresponds to the desired color. Colorant storage system 104 dispenses the colorants so, when combined with the paint components, the combination has a color driven to match the color represented by the color data file. Hence, the paint color indication can be provided to computer system 101 by selecting the color data file that corresponds with the desired color.

Figure 3A:
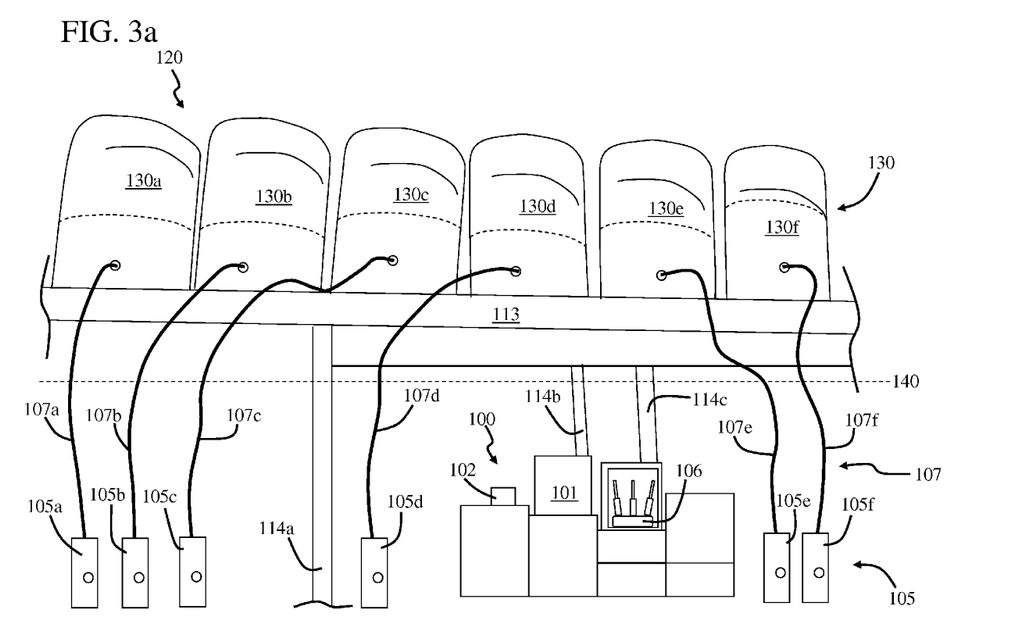
FIG. 3a is a perspective view of the paint manufacturing system of FIG. 2a with a pumping system, in accordance with the invention.
Figure 3B:
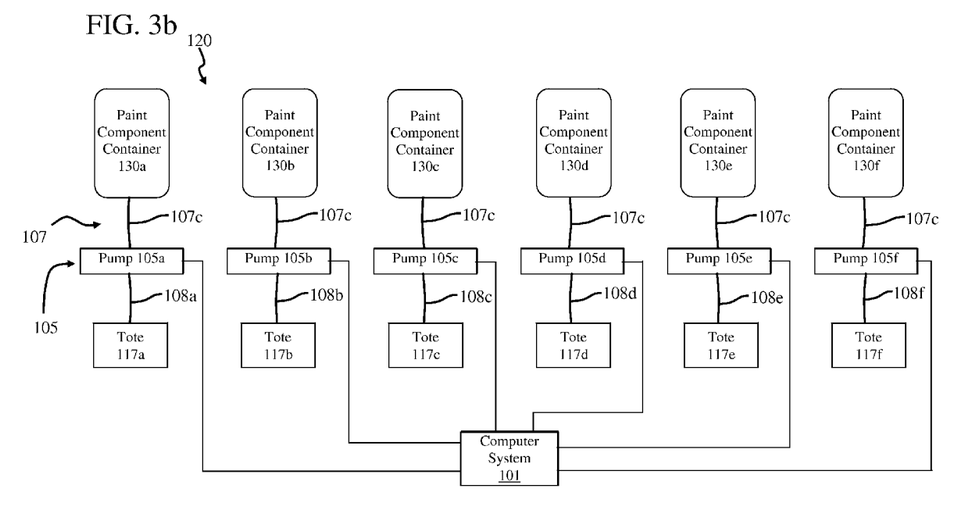
FIG. 3b is a schematic diagram of the paint manufacturing system of FIG. 2a with paint component transport containers.

FIG. 3a is a perspective view of paint manufacturing system 120 of FIG. 2a with a pumping system 105, in accordance with the invention, and FIG. 3b is a schematic diagram of paint manufacturing system 120. Pumping system 105 is in fluid communication with paint component storage system 130 through hoses. The operation of pumping system 105 is controlled by computer system 101, wherein computer system 101 controls the flow of paint components therethrough. Further, pumping system 105 is positioned below level 140 and paint component storage system 130 is positioned above level 140. In this way, pumping system 105 is useful for flowing paint components upwardly through level 140 and into paint component storage system 130. It should be noted, however, that pumping system 105 can flow paint components downwardly and into paint component storage system 130 if storage system 130 is positioned below paint manufacturing system 100.

In this embodiment, pumping system 105 includes pumps 105a, 105b, 105c, 105d, 105e and 105f in fluid communication with paint component storage containers 130a, 130b, 130c, 130d, 130e and 130f, respectively, through hoses 107a, 107b, 107c, 107d, 107e and 107f, respectively. Pumps 105a-105f can be of many different types, such as air diaphragm pumps. One type of air diaphragm pump that can be used is made by Warren Rupp and referred to as the SANDPIPER.

Pumps 105a-105f can also be peristaltic pumps, such as those made by Watson-Marlow Bredel and referred to as the SPX32 peristaltic pump.

Pumping system 105 is in fluid communication with paint component transport containers, embodied as totes 117a, 117b, 117c, 117d, 117e and 117f. In this embodiment, totes 117a, 117b, 117c, 117d, 117e and 117f are in fluid communication with pumps 105a, 105b, 105c, 105d, 105e and 105f, respectively, through hoses 108a, 108b, 108c, 108d, 108e and 108f, respectively. The totes can be of many different types, but they are generally lined containers capable of containing a paint component so that the paint component can be transported from one location to another.

In this embodiment, the totes are positioned below level 140 and paint component storage system 130 is positioned above level 140. In this way, the paint component is flowed from a level below level 140 to a level above it. However, the totes can be positioned above paint component storage system 130 if storage system 130 is positioned below paint manufacturing system 100.

Figure 3C:
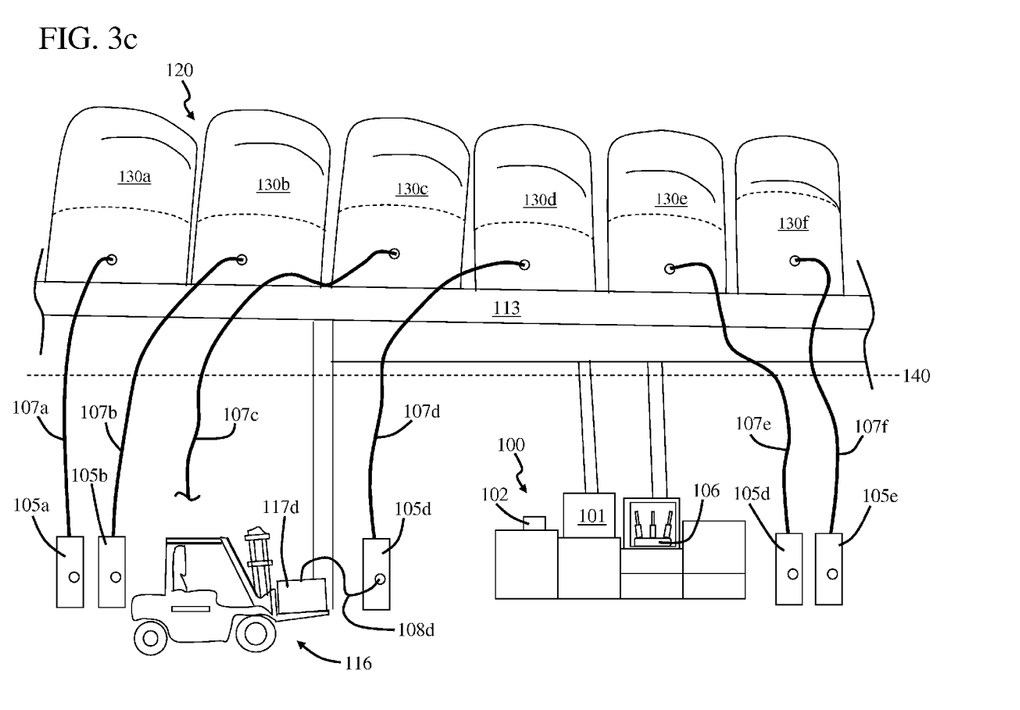
FIG. 3c is a perspective view of the paint manufacturing system of FIG. 3a, wherein the pumping system is connected to a tote carried by a fork lift.

In operation, a paint component transfer container, such as tote 117d, is positioned proximate to pump 105d. Tote 117d can be moved in many different ways, such as with a fork lift 116, as shown in FIG. 3c. Hose 108d is connected between tote 117d and pump 105d so they are in fluid communication with each other. Pump 105d flows the paint components contained by tote 117d from tote 117d, through hoses 108d and 107d, and into paint component container 130d. In this way, paint component container 130d is filled without interrupting the manufacture of paint. The manufacture of paint is not interrupted because paint components can be dispensed by dispenser 106 while paint component storage system 130 is being filled with paint components.

Figure 4A:
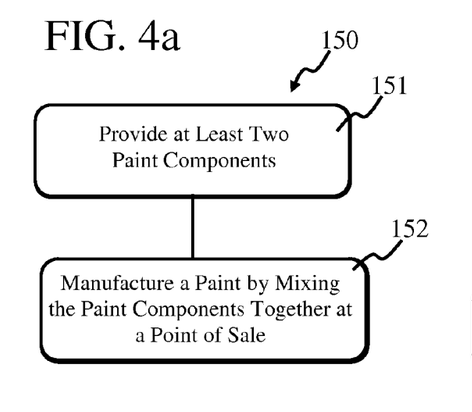
FIGS. 4a, 4b, 4c and 4d are block diagrams of a method of manufacturing a desired type of paint at a point of sale, in accordance with the invention.

FIG. 4a is a block diagram of a method 150 of manufacturing a desired type of paint at a point of sale, in accordance with the invention. In this embodiment, method 150 includes a step 151 of providing at least two paint components and a step 152 of manufacturing a paint by mixing the paint components together at a point of sale. In accordance with the invention, the paint components are selected from a group that includes a pigment composition, a dispersant thickening agent, and a resin content binder. In one particular embodiment, the paint components include a resin content binder, and a pigment composition and/or dispersant thickening agent. In accordance with the invention, the paint components are contained in separate containers before they are mixed together.

Figure 4B:
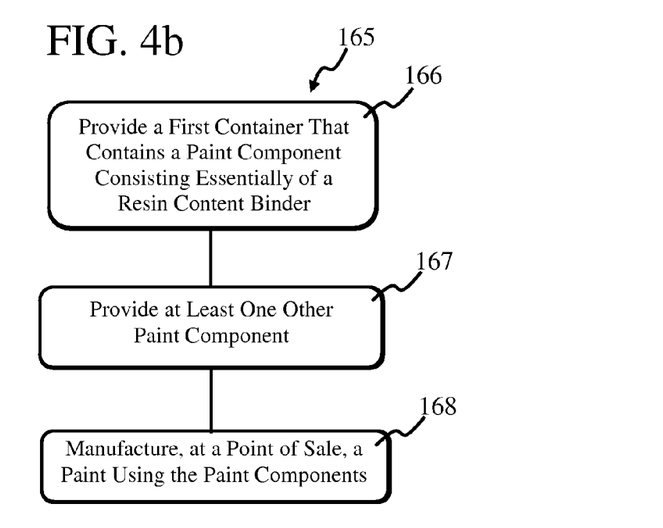

FIG. 4b is a block diagram of a method 165 of manufacturing a desired type of paint, in accordance with the invention. In this embodiment, method 165 includes a step 166 of providing a first container that contains a paint component that consists essentially of a resin content binder. Method 165 includes a step 167 of providing at least one other paint component. Method 165 includes a step 168 of manufacturing a paint, at a point of sale, using the paint components. In accordance with the invention, the paint is manufactured in a second container, such as paint container 110.

Figure 4C:
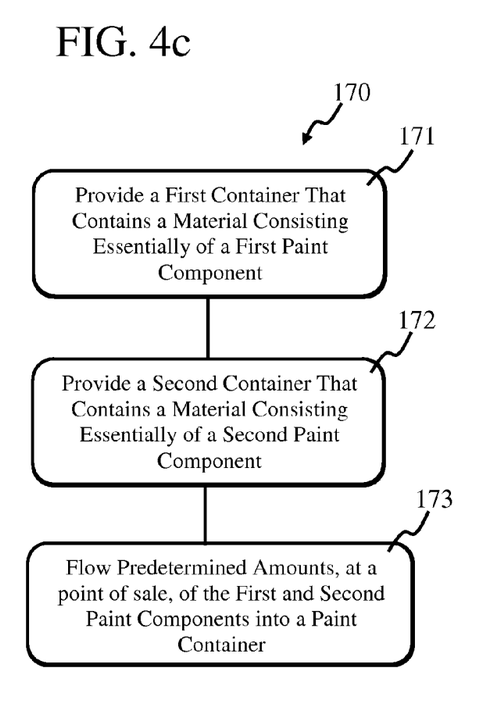

FIG. 4c is a block diagram of a method 170 of manufacturing a desired type of paint, in accordance with the invention. In this embodiment, method 170 includes a step 171 of providing a first container that contains a material consisting essentially of a first paint component. Method 170 includes a step 172 of providing a second container that contains a material consisting essentially of a second paint component. Method 170 includes a step 173 of flowing predetermined amounts, at a point of sale, of the first and second paint components into a paint container, such as paint container 110.

Figure 4D:
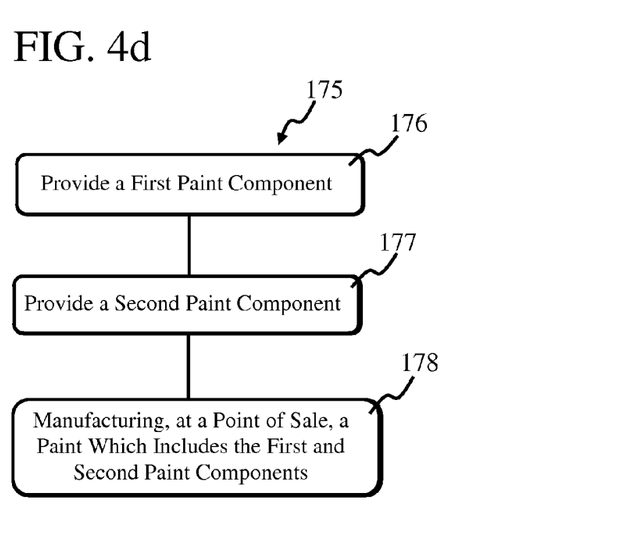

FIG. 4d is a block diagram of a method 175 of manufacturing a desired type of paint, in accordance with the invention. Method 175 includes a step 176 of providing a first paint component and a step 177 of providing a second paint component. The first and second paint components in steps 176 and 177 are generally provided in predetermined amounts. Method 175 includes a step 178 of manufacturing, at a point of sale, the paint which includes the first and second paint components. The paint is generally manufactured by combining the first and second paint components. The first and second paint components can be combined in many different ways, such as by mixing in a paint container, such as paint container 110.

Figure 5A:
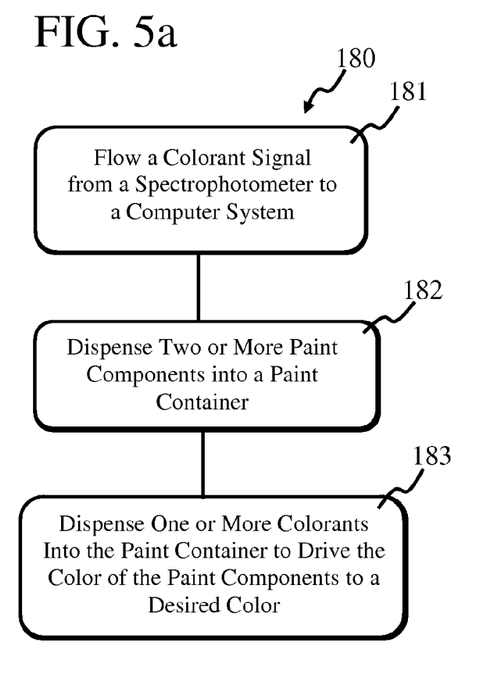
FIGS. 5a and 5b are block diagrams of a method of manufacturing a desired type of paint at a point of sale, and providing it with a desired color, in accordance with the invention.

FIG. 5a is a block diagram of a method 180 of manufacturing a desired type of paint at a point of sale, and providing it with a desired color, in accordance with the invention. In this embodiment, method 180 includes a step 181 of flowing a colorant signal from a spectrophotometer to a computer system. The colorant signal corresponds to an indication of a desired color. The indication of the desired color can be provided in many different ways, such as a color sample. Method 180 includes a step 182 of dispensing two or more paint components into a paint container. The type and amount of paint components dispensed is determined in response to an indication of a desired type of paint. Method 180 includes a step 183 of dispensing one or more colorants into the paint container to drive the color of the paint components to the desired color.

Figure 5B:
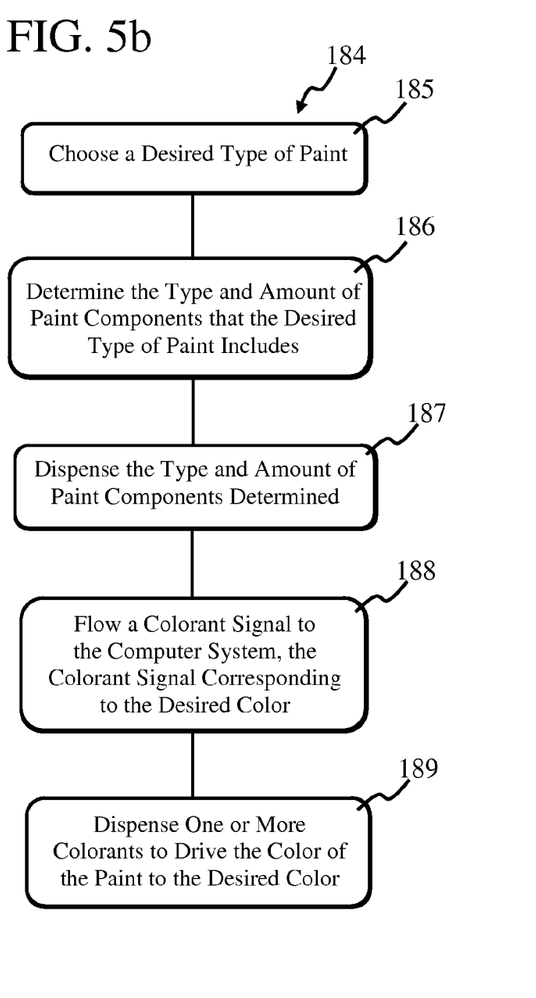

FIG. 5b is a block diagram of a method 184 of manufacturing a desired type of paint at a point of sale, and providing it with a desired color, in accordance with the invention. In this embodiment, method 184 includes a step 185 of choosing the desired type of paint. Method 184 includes a step 186 of determining the type and amount of paint components that the desired type of paint includes. Method 184 includes a step 187 of dispensing the type and amount of paint components determined in step 186 to produce the desired type of paint. Method 184 includes a step 188 of flowing a colorant signal to the computer system, the colorant signal corresponding to the desired color. Method 184 includes a step 189 of dispensing one or more colorants to drive the color of the paint to the desired color.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A paint manufacturing system, comprising:
  a paint component storage system comprising a plurality of paint component containers which includes an elevated support structure which supports the paint component storage system and which is elevated by support legs, wherein the elevated support structure includes a floor and sidewalls extending upwardly therefrom and extend around outer periphery of the floor, the sidewalls and the floor bounding an inner volume with a liner capable of containing leakage from the paint component storage system; and
  a paint dispenser system which includes
    a dispenser in fluid communication with the paint component storage system, wherein a portable paint container is positioned to receive a desired combination of paint components; and a computer system which controls a flow of paint components from the paint component storage system, the paint component storage system flowing the desired combination of paint components in response to a paint type indication.

2. The system of claim 1, wherein the computer system controls the flow of paint components from the paint component storage system by controlling the operation of a mass flow controller system connected thereto.

3. The system of claim 2, further including a tote in fluid communication with the paint component storage system through a pumping system.

4. The system of claim 3, wherein the pumping system flows the paint component contained by the tote into the paint component storage system.

5. The system of claim 1, further including a spectrophotometer which provides a colorant signal to the computer system, the colorant signal corresponding to a color of a color card.

6. The system of claim 5, further including a colorant storage system operatively coupled with the computer system, the colorant storage system dispensing a desired combination of colorants in response to the colorant signal.

7. The system of claim 6, wherein the colorants dispensed drive a color of the dispensed paint components to match the color of the color card.

8. A paint manufacturing system, comprising:
a paint component storage system comprising a plurality of paint component containers which includes an elevated support structure which supports the paint component storage system and which is elevated by support legs, wherein the elevated support structure includes a floor and sidewalls extending upwardly therefrom and extend around outer periphery of the floor, the sidewalls and the floor bounding an inner volume with a liner capable of containing leakage from the paint component storage system; and
a paint dispenser system which includes
a colorant storage system;
a dispenser in fluid communication with the paint component and colorant storage systems, wherein a portable paint container is positioned to receive paint components and colorants; and
a computer system which controls the flow of the paint components from the paint component storage system and the colorants from the colorant storage system according to the desired combination of paint components in response to a paint type indication and a desired combination of colorants in response to a paint color indication.

9. The system of claim 8, wherein the dispenser dispenses a desired combination of paint components from the paint component storage system in response to the computer system receiving a paint type indication.

10. The system of claim 8, wherein the dispenser dispenses a desired combination of colorants from the colorant storage system in response to the computer system receiving a paint color indication.

11. The system of claim 10, wherein the paint color indication is provided by a spectrophotometer operatively coupled with the computer system.

12. The system of claim 8, further including at least one tote in fluid communication with the paint component storage system through a pumping system.

13. The system of claim 12 wherein the tote is carried by a forklift.

14. The system of claim 1, wherein the dispenser includes a paint component nozzle.

15. The system of claim 14, further including a nozzle support structure which supports the paint component nozzle.

16. The system of claim 15, further including a colorant nozzle carried by the nozzle support structure.

17. The system of claim 1, wherein the portable paint container is a paint bucket.

18. The system of claim 1, wherein the portable paint container is seated on a scale.

19. The system of claim 8, wherein the computer system separately controls the flow of paint components from the paint component storage system and colorants from the colorant storage system.

20. The system of claim 8, wherein the paint component storage system includes a plurality of paint component storage containers and the colorant storage system includes a plurality of colorant containers.

21. The system of claim 20, wherein the dispenser includes a plurality of paint component nozzles, each paint component nozzle being in fluid communication with a corresponding paint component storage container.

22. The system of claim 21, wherein the paint components flow separately through the dispenser.

23. The system of claim 20, wherein the dispenser includes a plurality of colorant nozzles, each colorant nozzle being in fluid communication with a corresponding colorant container.

24. The system of claim 23, wherein the colorants flow separately through the dispenser.

25. A paint manufacturing system, comprising:
a paint component storage system comprising a plurality of paint component containers carried by an elevated support structure which supports the paint component storage system and which is elevated by support legs, wherein the elevated support structure includes a floor and sidewalls extending upwardly therefrom and extend around outer periphery of the floor, the sidewalls and the floor bounding an inner volume with a liner capable of containing leakage from the paint component storage system; and
a paint dispenser system which includes
a colorant storage system;
a dispenser having a paint component nozzle in fluid communication with the paint component storage system, and a colorant nozzle in fluid communication with the colorant storage system, wherein a portable paint container is positioned to receive a paint component and a colorant; and
a computer system which controls the flow of the paint component through the paint component nozzle and the colorant through the colorant nozzle according to the desired combination of paint components in response to a paint type indication and a desired combination of colorants in response to a paint color indication.

* * * * *